US007641371B2

(12) United States Patent
Effner et al.

(10) Patent No.: US 7,641,371 B2

(45) Date of Patent: Jan. 5, 2010

(54) MOTOR VEHICLE LIGHT COMPRISING A PLASTIC COVER DISK

(75) Inventors: Torben Effner, Landshut (DE); Florian Geltinger, Neufahrn/Niederbayern (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 205 days.

(21) Appl. No.: 11/657,050

(22) Filed: Jan. 24, 2007

(65) Prior Publication Data

US 2008/0043483 A1 Feb. 21, 2008

Related U.S. Application Data

(63) Continuation of application No. PCT/EP2005/007039, filed on Jun. 30, 2005.

(30) Foreign Application Priority Data

Aug. 11, 2004 (DE) ...................... 10 2004 039 004

(51) Int. Cl.
*B60Q 1/00* (2006.01)

(52) U.S. Cl. ...................... 362/487; 362/485; 362/496; 362/501; 362/506; 362/545

(58) Field of Classification Search .................. 362/84, 362/485, 487, 493–496, 500–503, 505, 506, 362/545, 800; 313/512; 296/901.01
See application file for complete search history.

(56) References Cited

U.S. PATENT DOCUMENTS

| | | | | |
|---|---|---|---|---|
| 5,904,416 A * | 5/1999 | Muller | ...................... | 362/505 |
| 6,152,590 A * | 11/2000 | Furst et al. | .................. | 362/545 |
| 6,616,313 B2 | 9/2003 | Fuerst et al. | | |
| 6,739,733 B1 | 5/2004 | Lamke et al. | | |
| 2001/0053082 A1 | 12/2001 | Chipalkatti et al. | | |
| 2002/0008539 A1 | 1/2002 | Osaka et al. | | |
| 2002/0012251 A1 | 1/2002 | Lee et al. | | |

FOREIGN PATENT DOCUMENTS

| | | |
|---|---|---|
| DE | 198 05 771 A1 | 8/1999 |
| EP | 1 110 816 A2 | 6/2001 |
| EP | 1 391 348 A2 | 2/2004 |
| GB | 2 284 305 A | 5/1995 |

OTHER PUBLICATIONS

International Search Report dated Oct. 4, 2005 with an English translation (Six (6) pages).
Form PCT/IB/338 dated Apr. 12, 2007 and PCT/ISA/237 dated Apr. 3, 2007 (seven (7) pages).

* cited by examiner

*Primary Examiner*—Stephen F Husar
(74) *Attorney, Agent, or Firm*—Crowell & Moring LLP

(57) ABSTRACT

A motor vehicle light including a plastic cover disc and a light unit that is mounted behind the surface of the cover disc is provided. The light unit is at least partially encased by the plastic of the cover disc and is fixed in position against the cover disc by the casing.

3 Claims, 3 Drawing Sheets

101 102 104 106 107 108 105 103

MOTOR VEHICLE LIGHT COMPRISING A PLASTIC COVER DISK

CROSS REFERENCE TO RELATED APPLICATIONS

Figure 1:
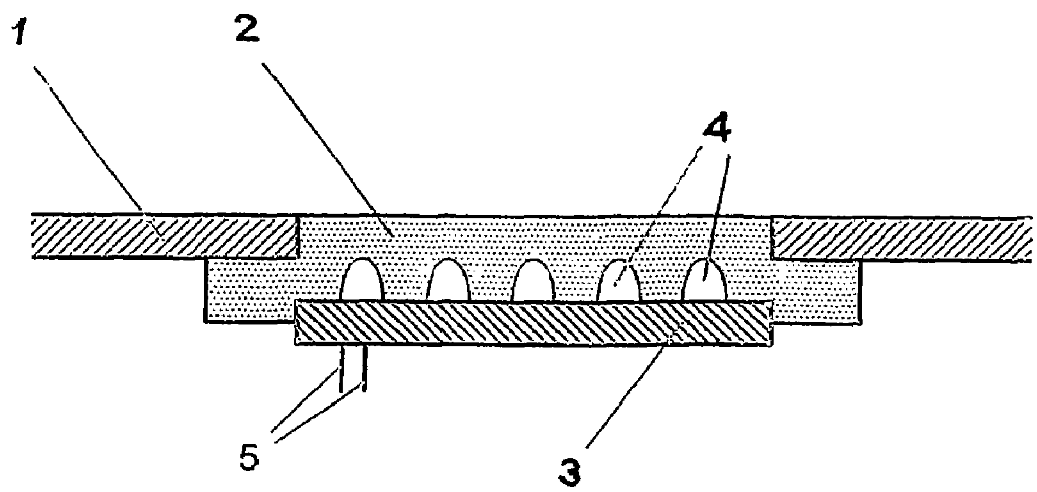

This application is a continuation of PCT International Application No. PCT/EP2005/007039, filed Jun. 30, 2005, which claims priority under 35 U.S.C. § 119 to German Patent Application No. 10 2004 039 004.5, filed Aug. 11, 2004, the entire disclosures of which are herein expressly incorporated by reference.

BACKGROUND AND SUMMARY OF THE INVENTION

The present invention relates to a motor vehicle light having a cover disk manufactured from plastic and a light unit mounted behind the surface of the cover disk.

Conventionally constructed motor vehicle lights are essentially assembled from a light well, a light unit inserted into the light well, and a cover disk which closes the light well. The light unit includes at least one lamp (e.g., incandescent lamp, LED, electroluminescent film), possibly a reflector, means for receiving the lamp (e.g., lamp socket), possibly an electrical circuit for operating the lamp, and the electrical terminals of the motor vehicle light, which are typically led outward through the light well. A reflector may simultaneously form a part of the light well of a motor vehicle light. In particular, when LEDs are used as lamps, the circuit board of an electrical circuit is simultaneously used to receive the LEDs. The cover disk of a motor vehicle light frequently also has optical functions in addition to the function of mechanically securing and moisture-resistantly closing the motor vehicle light to the vehicle exterior. A desired light conduction and/or refraction is implemented by the use of suitable materials and suitable shaping of the cover disk.

Motor vehicle lights represent a significant cost factor in the manufacturing process of a motor vehicle, since significant outlay for construction, mounting, and logistics typically arises in the planning, provision, and installation of the motor vehicle lights in the vehicle.

From a constructive viewpoint, fasteners (e.g., clamps, clips, screw connections) must be provided on the vehicle and on the light. In addition to actually providing these fasteners, the overall space occupied by the fasteners, and required to ensure accessibility of the fasteners during mounting, is to be planned into the overall concept of the vehicle.

Logistical outlay arises, for example, for providing all components of the motor vehicle light correctly for mounting and/or the motor vehicle light as a complete part, as well as for providing the fasteners.

In the scope of the mounting, the motor vehicle light is first to be attached to the overall vehicle by the fasteners. Subsequently, to ensure the aesthetic appearance of the motor vehicle, the dimensions for joining the motor vehicle light to all neighboring parts of the motor vehicle are to be set exactly in a multistep process.

To solve part of the cited problems, integrating either the light well or the cover disk of the motor vehicle light in a plastic component which represents a part of the outer skin of the motor vehicle is known. For example, a motor vehicle light is known from US 2002/008539 A1, whose cover disk is integrated by an injection molding method in a bumper made of plastic. Thus, setting the join dimensions is not required.

However, in a motor vehicle light according to US 2002/008539 A1, except for the integration of the components, the conventional structure of a motor vehicle light described above is maintained in principle. One component of the motor vehicle light, i.e., the cover disk, is integrated into the outer skin. However, the two other essential components of the motor vehicle light, i.e., the light well and the light unit, are still provided as separate components not integrated into the outer skin. Most of the above-mentioned disadvantages of a motor vehicle light thus remain. In particular, fasteners are still required, because of which, inter alia, a comparatively large overall volume is to be provided for the fasteners and their accessibility. In addition, specific components of the motor vehicle light and fasteners must still be provided for mounting, which requires a corresponding logistical outlay.

An object of the present invention is to provide a motor vehicle light which is incorporated into a plastic component of the outer skin of a motor vehicle or fastened thereto such that the smallest possible overall volume is provided for the motor vehicle light and its mounting.

The object is achieved by a motor vehicle light according to the present invention, in which the light unit is at least partially encased in a formfitting way by the plastic of the cover disk and is attached fixed in position to the cover disk by the casing.

The light unit therefore does not have to be fixed separately in its position in relation to the cover disk or the outer skin by fasteners in the mounting process of the motor vehicle. By eliminating the fasteners and the mounting steps for the fastening, the volume of the overall space to be provided for the motor vehicle light is significantly reduced in relation to the prior art.

The motor vehicle light only occupies the overall space toward the vehicle interior which is defined by the volume of the light unit. In addition, in specific embodiments of a device according to the present invention, there is a plastic layer which covers the light unit toward the vehicle interior. The overall volume of this plastic layer is comparatively low in relation to the overall volume of typical fasteners which normally project significantly beyond the light unit. In addition, the necessity of providing overall space for the accessibility of the fasteners during the mounting is eliminated by eliminating the fasteners.

According to an advantageous refinement of the present invention, the light unit is also encased by the plastic of the cover disk on the side facing toward the vehicle interior in such way that it fulfills the function of a light well of protecting against mechanical damage and the penetration of moisture. Alternatively, the light unit may be implemented as covered by a plastic or metal housing on the side facing toward the vehicle interior for this purpose.

Viewed from the vehicle exterior, the light unit of a motor vehicle light according to the present invention is situated behind the surface of the cover disk and therefore protected.

A motor vehicle light according to the present invention having especially low requirements for the volume of the overall space available may be provided if the light unit itself is implemented having low overall depth. This is typically provided in reflector-free motor vehicle lights using inorganic LEDs (LEDs), organic LEDs (OLEDs), and/or electroluminescent films (EL films) as lamps. By using a light unit having lower overall depth, the overall depth of the motor vehicle light may also be kept low. A motor vehicle light according to the present invention having low overall depth is only to be taken into consideration in the planning of the overall space in a motor vehicle as a slight bulge of the plastic component in which the motor vehicle light is integrated. If the overall depth of the light unit is so low that the join thickness of cover disk and light unit does not exceed the thickness of the surrounding outer skin, even such a bulge disappears.

A motor vehicle light according to the present invention may be manufactured not by first assembling the light unit after the manufacturing of the plastic parts of cover disk and outer skin, as is typical according to the prior art, but rather by incorporating the light unit already in the injection molding method of at least the cover disk, and possibly both plastic parts.

According to an exemplary embodiment of the present invention, the cover disk and the surrounding outer skin are implemented as a single plastic component manufactured in a multicomponent injection molding method. In the manufacturing process, the light unit is incorporated into the injection molding method such that in the resulting plastic component, the light unit is entirely or partially encased by the plastic of the cover disk in a formfitting way so that the light unit is attached to the cover disk and fixed in place by the casing. In the case of complete encasement by the plastic of the cover disk, the light unit is fastened to the cover disk and fixed in place, in that the light unit is enclosed in the cover disk. The possibility of power supply and activation of the light unit by the vehicle electronics is ensured by leading corresponding terminals from the light unit out of the plastic.

Another exemplary embodiment of the present invention differs from the above-described embodiment in that the light unit is not exclusively encased by the plastic of the cover disk and attached to the cover disk, but rather the light unit is additionally partially encased by the plastic of the surrounding outer skin and is therefore fastened to both the cover disk and also the outer skin. This embodiment of the present invention has the advantage that the strength of the connection between cover disk and outer skin may be increased by the light unit incorporated into both plastic components. In addition, an illumination of the cover disk in its edge areas is favored in this way, since lamps whose light is to be emitted through the edge areas of the cover disk to the vehicle surroundings do not have to be placed on the outermost edge of a circuit board.

According to another exemplary embodiment of the present invention, a motor vehicle light is designed in such way that a multicomponent injection molding method is not to be used to manufacture a cover disk and outer skin. Instead, the cover disk and outer skin are implemented as plastic components which may first be manufactured separately. An opening capable of receiving the cover disk is provided in the outer skin, in which the cover disk may be inserted later as an insert part. The light unit may be partially or entirely encased in a formfitting way by the plastic of the cover disk so that the light unit is fastened to the cover disk and fixed in place by the casing. The cover disk having an integrated light unit is inserted into the opening of the outer skin capable of receiving it and is fastened by a removable or permanent catch connection, by a glue or weld bond, or by an injection molding method (e.g., injection or extrusion coating) to the outer skin. The cover disk having the integrated light unit may be fastened to the outer skin in the manufacturing process after the separate manufacturing of the outer skin and the cover disk having the integrated light unit.

Inorganic or organic LEDs as well as electroluminescent films are especially suitable as lamps for a motor vehicle light according to the present invention. Such lamps allow a flat construction of the light unit. In particular, with specific types of LEDs, the robustness of the lamp is so high that it is not damaged in the injection molding method under appropriate manufacturing conditions during the plastic encasing. In addition, because of the high reliability and service life of LEDs, the fact that the LEDs of most embodiments of a motor vehicle light according to the present invention may only be changed with very great difficulty does not represent a disadvantage in practice.

Other objects, advantages and novel features of the present invention will become apparent from the following detailed description of the invention when considered in conjunction with the accompanying drawings.

BRIEF DESCRIPTION OF THE DRAWING FIGURES

Figure 2:
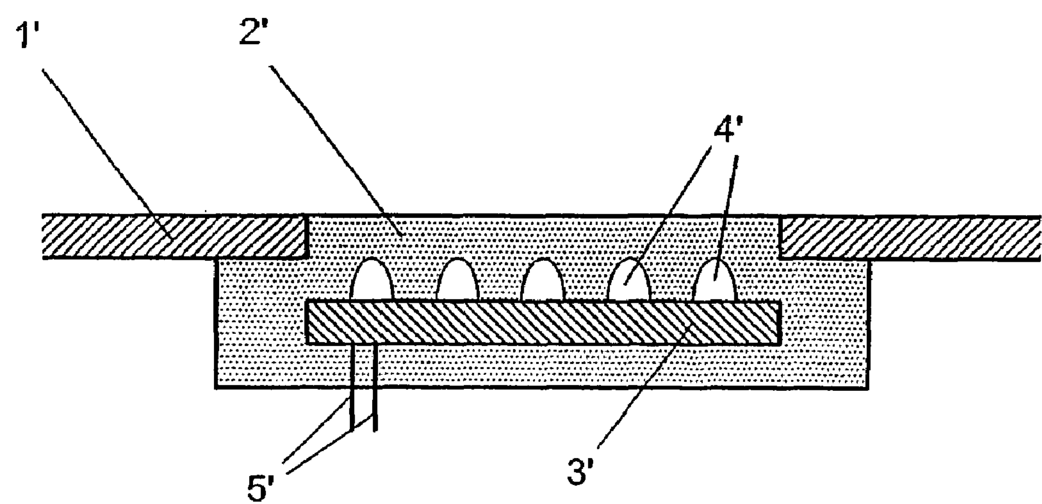
Figure 3:
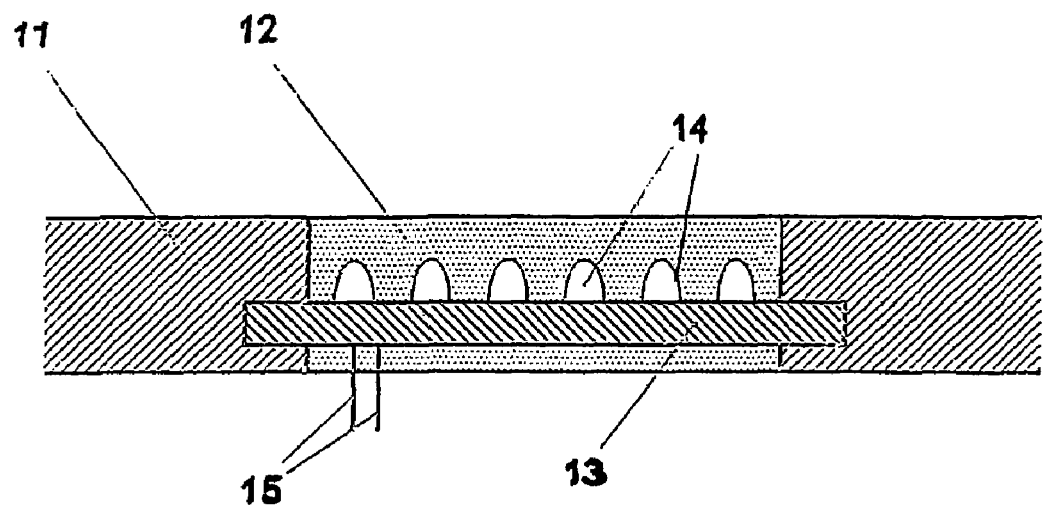
Figure 4:
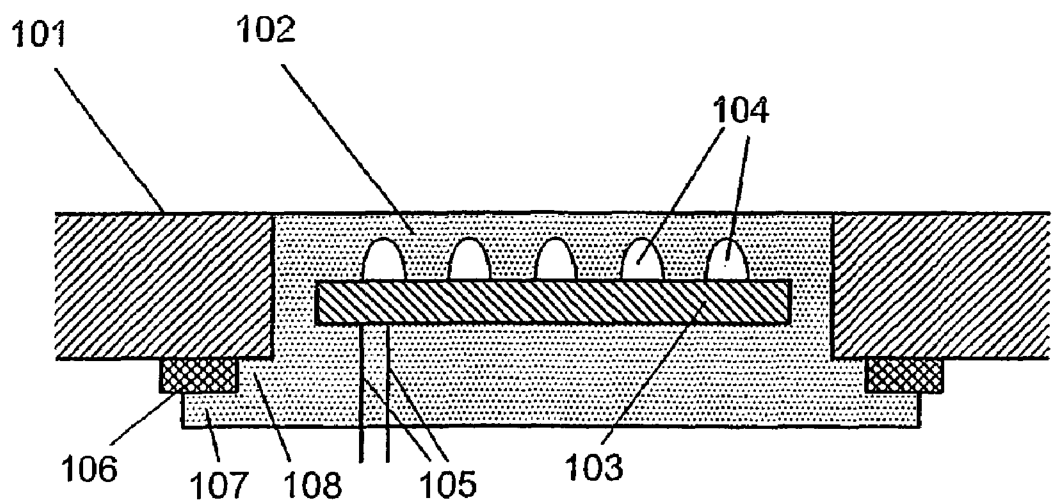
Figure 5:
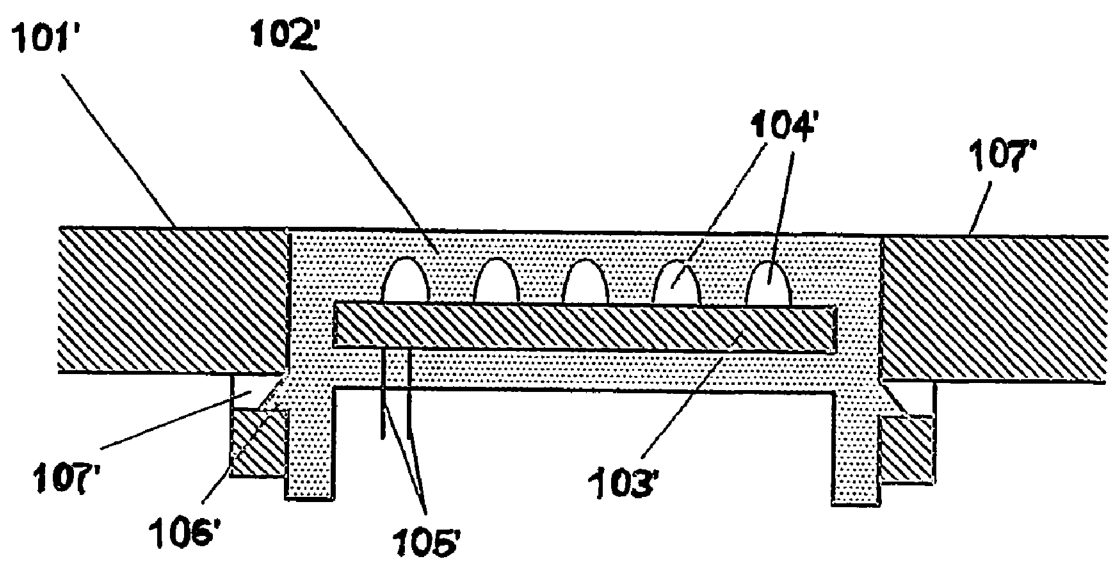

FIG. 1 shows a cross-sectional view through a motor vehicle light according to an exemplary embodiment of the present invention having a light unit partially encased in the cover disk, FIG. 2 shows a cross-sectional view through a motor vehicle light according to an exemplary embodiment of the present invention having a light unit completely encased in the cover disk, FIG. 3 shows a cross-sectional view through a motor vehicle light according to another exemplary embodiment of the present invention, FIG. 4 shows a cross-sectional view through a motor vehicle light according to an exemplary embodiment of the present invention having a cover disk injected onto the outer skin, and FIG. 5 shows a cross-sectional view through a motor vehicle light according to an exemplary embodiment of the present invention having a cover disk attached to the outer skin by a catch connection.

DETAILED DESCRIPTION OF THE DRAWINGS

FIG. 1 schematically shows a cross-section of a motor vehicle light according to an exemplary embodiment of the present invention. The cover disk 2 of the motor vehicle light according to the present invention and a plastic element 1 belonging to the outer skin of the motor vehicle, which encloses the cover disk 2, are manufactured as a single plastic component by a multicomponent injection molding method. The cover disk 2 is thus incorporated directly into the plastic element 1 belonging to the outer skin of the motor vehicle. The light unit, which encases the lamp 4 (e.g., LEDs) attached to a circuit board 3, is partially encased by the plastic of the cover disk 2 in a formfitting way. In the manufacturing process, the light unit 3, 4 is incorporated for this purpose in a suitable way into the multicomponent injection molding method for producing the outer skin 1 having integrated cover disk 2. The light unit 3, 4 is attached to the cover disk 2 and fixed in place by the formfitting encasement. Viewed from the vehicle exterior, the light unit 3, 4 is situated completely behind the surface of the cover disk 2. Corresponding electrical terminals 5 are provided on the circuit board 3 for the power supply and activation of the light unit 3, 4 by the vehicle electronics.

FIG. 2 also shows a cross-sectional view through a motor vehicle light according to an exemplary embodiment of the present invention. A light unit includes a circuit board 3' and a lamp 4' attached thereto which is completely encased in the cover disk 2' of the motor vehicle light. The light unit 3', 4' is also encased in this way on the side facing toward the vehicle interior by the plastic of the cover disk 2' so that the light unit is protected, comparable to a light well, from mechanical damage and the penetration of moisture. The possibility of power supply and activation of the light unit 3', 4' by the vehicle electronics is, however, still ensured in that the electrical terminals 5' are led out of the light unit 3', 4' from the plastic of the cover disk 2'. The cover disk 2' is implemented in the motor vehicle light of FIG. 2 jointly with the plastic element 1' belonging to the outer skin of the motor vehicle as a single plastic component by manufacturing in a multicomponent injection molding method.

A cross-sectional view through a motor vehicle light according to another exemplary embodiment of the present invention is illustrated in FIG. 3. The embodiment of the present invention illustrated from FIG. 3 differs from the embodiment, illustrated in FIGS. 1 and 2 essentially in that the light unit assembled from the circuit board 13 and the lamp 14 attached thereto is not exclusively encased by the plastic of the cover disk 12, but additionally is partially encased by the plastic of the surrounding outer skin 11. The attachment of the light unit 13, 14 is thus also implemented by an interaction of cover disk 12 and outer skin 11. In addition, the mechanical connection between cover disk 12 and outer skin 11 is reinforced by the light unit 13, 14 encased by both of them. Good illumination of the cover disk 12 in its edge areas viewed from the vehicle exterior is implemented by arranging individual lamps 14 behind the edge areas of the surface of the cover disk 12. Since the circuit board 13 projects up into the plastic of the outer skin 11, the LEDs 14 do not have to be placed on the outermost edge of the circuit board 13 for this purpose. Electrical terminals 15 again allow power supply and activation of the light unit 13, 14.

A cross-sectional view through a motor vehicle light according to another exemplary embodiment of the present invention is illustrated in FIG. 4. The cover disk 102 is attached by an adhesive bond to the outer skin 101. A feature of the embodiment of the present invention illustrated in FIG. 4 is that a multicomponent injection molding method is not necessary to manufacture outer skin 101 and cover disk 102. Instead, the cover disk 102 and the outer skin 101 are implemented as plastic components which are initially manufactured separately. An opening suitable for receiving the cover disk is provided in the manufacturing process in the outer skin 101, into which the cover disk 102 is inserted as an insert part. The light unit including circuit board 103 and lamp 104 is encased in a formfitting way by the plastic of the cover disk 102 and attached to the cover disk 102 and fixed in place by the casing. For this purpose, the light unit 103, 104 is incorporated in a suitable way in the injection molding method for producing the cover disk 102.

The insert part cover disk 102 having integrated light unit 103, 104 is attached in the case shown in FIG. 4 by an adhesive bond to the outer skin 101. The gluing procedure is performed in the manufacturing process after the separate manufacturing of the outer skin 101 and the insert part cover disk 102 having integrated light unit 103, 104. The adhesive 106 is introduced for this purpose between outer skin 101 and cover disk 102. In the case shown, an adhesive flange 107 and a web 108 as an adjustment rib are provided for the adhesive bond on the cover disk 102. In an otherwise comparable way, the insert part cover disk 102 having integrated light unit 103, 104 may also be attached in the opening of the outer skin 101 by a catch connection, by a weld bond, or by an injection molding method (e.g., injecting on or extrusion coating) instead of by an adhesive bond.

The use of a catch connection, shown in FIG. 5, offers various further advantages. The cover disk 102' having integrated light unit 103', 104' may be inserted in the outer skin 101' and/or temporarily removed therefrom again at nearly any arbitrary point in the manufacturing process with little effort. Thus, for example, the necessity of covering the cover disk 102' in case of lacquering the outer skin 101' may be avoided. In addition, the use of a catch connection allows the isolated replacement of the cover disk 102' having integrated light unit 103', 104' in case of a defect or damage.

The catch connection is implemented as shown in FIG. 5 by providing at least one catch element 106' on the cover disk 102' and a recess 107' suitable for receiving the catch element 106' in the plastic of the outer skin. A removable or permanent catch connection is achieved depending on the design of the catch element 106' and the recess 107'.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle light having a cover disk manufactured from plastic and a light unit attached behind a surface of the cover disk, wherein the light unit includes a circuit board and at least one lamp attached to the circuit board and is entirely encased in a formfitting way by the plastic of the cover disk and is attached to the cover disk and fixed in place by the cover disk, wherein the cover disk is incorporated into the outer skin of a motor vehicle, which is manufactured from plastic, by a multicomponent injection molding method, wherein the cover disk includes a plurality of flanges, each of which is attached to an inner side of the outer skin by at least one of an injection molding, a weld bond and an adhesive bond.

2. A motor vehicle light having a cover disk manufactured from plastic and a light unit attached behind a surface of the cover disk, wherein the light unit includes a circuit board and at least one lamp attached to the circuit board and is entirely encased in a formfitting way by the plastic of the cover disk and is attached to the cover disk and fixed in place by the cover disk, wherein the cover disk is inserted into an opening of the outer skin of a motor vehicle, which is manufactured from plastic, suitable for receiving the cover disk, and wherein the cover disk is attached to the outer skin by being injected on or extrusion coated, wherein the cover disk includes a plurality of flanges, each of which is attached to an inner side of the outer skin by at least one of an injection molding, a weld bond and an adhesive bond.

3. A motor vehicle light, comprising:

a plastic cover disk; and a light unit attached behind a surface of the cover disk, the light unit including a circuit board and at least one lamp attached to the circuit board and being entirely and formfittingly encased by the cover disk, attached to the cover disk and fixed in place by the cover disk, wherein the cover disk is incorporated into the outer skin of a motor vehicle, which is manufactured from plastic, by a multicomponent injection molding method, wherein the cover disk includes a plurality of flanges, each of which is attached to an inner side of the outer skin by at least one of an injection molding, a weld bond and an adhesive bond.

* * * * *